US012767801B2

(12) United States Patent
Kahlen et al.

(10) Patent No.: US 12,767,801 B2
(45) Date of Patent: *Oct. 20, 2026

(54) POLYOLEFIN COMPOSITION COMPRISING POLYPROPYLENE HOMOPOLYMER AND RECYCLED PLASTIC MATERIAL

(71) Applicant: Borealis AG, Vienna (AT)

(72) Inventors: Susanne Margarete Kahlen, Linz (AT); Angelica Maëlle Delphine Legras, Linz (AT); Hermann Braun, Linz (AT); Michael Jerabek, Linz (AT); Wolfgang Stockreiter, Linz (AT); Erwin Kastner, Linz (AT)

(73) Assignee: Borealis AG, Vienna (AT)

( * ) Notice: Subject to any disclaimer, the term of this patent is extended or adjusted under 35 U.S.C. 154(b) by 905 days.

This patent is subject to a terminal disclaimer.

(21) Appl. No.: 18/021,444

(22) PCT Filed: Oct. 18, 2021

(86) PCT No.: PCT/EP2021/078781

§ 371 (c)(1),
(2) Date: Feb. 15, 2023

(87) PCT Pub. No.: WO2022/084236

PCT Pub. Date: Apr. 28, 2022

(65) Prior Publication Data

US 2023/0295405 A1 Sep. 21, 2023

(30) Foreign Application Priority Data

Oct. 19, 2020 (EP) .................................... 20202544

(51) Int. Cl.

| | |
|---|---|
| ***C08K 7/14*** | (2006.01) |
| ***B29C 48/00*** | (2019.01) |
| ***C08K 5/092*** | (2006.01) |
| ***C08L 23/12*** | (2006.01) |
| *B29K 23/00* | (2006.01) |

(52) U.S. Cl.

CPC ............ *C08L 23/12* (2013.01); *B29C 48/022* (2019.02); *C08K 5/092* (2013.01); *C08K 7/14* (2013.01); *B29K 2023/12* (2013.01); *C08K 2201/004* (2013.01); *C08L 2207/02* (2013.01); *C08L 2207/20* (2013.01)

(58) Field of Classification Search

CPC .. C08L 23/12; C08L 2207/02; C08L 2207/20; C08L 23/06; C08L 2205/025; B29C 48/022; C08K 5/092; C08K 7/14; C08K 2201/004; B29K 2023/12; C08J 2323/12; C08J 2400/30; C08J 2423/06; C08J 11/04; Y02P 20/143; Y02W 30/62; B29B 9/10; B29B 11/10

See application file for complete search history.

(56) References Cited

U.S. PATENT DOCUMENTS

| | | | |
|---|---|---|---|
| 2012/0046411 | A1 | 2/2012 | Kulshrestha et al. |
| 2018/0201768 | A1 | 7/2018 | Jerabek et al. |

FOREIGN PATENT DOCUMENTS

| | | | | |
|---|---|---|---|---|
| DE | 102015012514 A1 | 3/2017 | | |
| EP | 2308923 A1 | 4/2011 | | |
| EP | 1377632 B1 | 11/2011 | | |
| EP | 3095820 A1 | 11/2016 | | |
| EP | 3118249 A1 | 1/2017 | | |
| EP | 3165473 A1 | 5/2017 | | |
| EP | 2845876 B1 | 5/2018 | | |
| EP | 3406662 A1 | 11/2018 | | |
| EP | 3461859 A1 | 4/2019 | | |
| JP | 2016064668 A | 4/2016 | | |
| JP | 2018522102 A | 8/2018 | | |
| JP | 2018532859 A | 11/2018 | | |
| KR | 20180028498 A | 3/2018 | | |
| RU | 2378299 C1 | 1/2010 | | |
| WO | 03031174 A2 | 4/2003 | | |
| WO | 2014167493 A1 | 10/2014 | | |
| WO | 2015121160 A1 | 8/2015 | | |
| WO | WO-2015169690 A1 | * | 11/2015 | ........... C08F 210/06 |
| WO | 2018086959 A1 | 5/2018 | | |
| WO | WO-2018206353 A1 | * | 11/2018 | ............. C08L 23/10 |
| WO | 2019198037 A1 | 10/2019 | | |
| WO | 2019224129 A1 | 11/2019 | | |
| WO | 2020070176 A1 | 4/2020 | | |
| WO | 2020201084 A1 | 10/2020 | | |

OTHER PUBLICATIONS

"Datasheet Polypropylene Dipolen PP-70", BOREALIS, 2022, accessed at<https://www.borealisgroup.com/storage/Datasheets/PP-74-PL_STATREG_WORLD-EN-V4-PLS_CHEM-61532-10059884.pdf>.
Signoret et al. "Alterations of plastic spectra in MIR and the potential impacts on the identification towards recycling", Resources, Conservation and Recycling Journal, 2020, 1 page, vol. 161.
Bajracharya, R.M. et al. "Experimental and theoretical studies on the properties of injection moulded glass fibre reinforced mixed plastics composites" Composites: Part A: Applied Science and Manufacturing, 2016, pp. 393-405, vol. 84.
Bajracharya, R.M. et al. "Durability characteristics and property prediction of glass fibre reinforced mixed plastics composites" Composites: Part B: Engineering, 2017, pp. 16-29, vol. 116.
Colucci, G. et al. "Effect of recycling on polypropylene composites reinforced with glass fibres" Journal of Themoplastic Composite Materials, 2017, pp. 707-723, vol. 30:5.

(Continued)

*Primary Examiner* — Kumar R Bhushan
(74) *Attorney, Agent, or Firm* — The Webb Law Firm

(57) ABSTRACT

Provided is a polyolefin composition including a) at least one polypropylene homopolymer; b) a blend of recycled plastic material including polypropylene and polyethylene in a ratio between 3:7 and 10:1, which is recovered from a waste plastic material derived from post-consumer and/or post-industrial waste; c) glass fibers; and d) at least one coupling agent. The polyolefin composition has a melt flow rate $MFR_2$ (230° C., 2.16 kg, measured according to ISO 1133) of at least 2 g/10 min; a tensile modulus (ISO 527-2) of at least 4 GPa, and an impact strength (ISO179-1, Charpy 1eA +23° C.) of at least 6 kJ/$m^2$.

14 Claims, No Drawings

(56) References Cited

OTHER PUBLICATIONS

Evens, T. et al. "The Influence of Mechanical Recycling on Properties in Injection Molding of Fiber-Reinforced Polypropylene" Intern, Polymer Processing XXXIV, 2019, pp. 398-407, vol. 4.
Senkerik et al. "Behavior of Recycled Polypropylene with Glass Fibers at Different Temperature ad their Charpy Impact and Hardness Properties" Material Science Forum, pp. 136-143 vol. 919.

* cited by examiner

POLYOLEFIN COMPOSITION COMPRISING POLYPROPYLENE HOMOPOLYMER AND RECYCLED PLASTIC MATERIAL

CROSS REFERENCE TO RELATED APPLICATIONS

This application is the United States national phase of International Patent Application No. PCT/EP2021/078781, filed Oct. 18, 2021, and claims priority to European Patent Application No. 20202544.1, filed Oct. 19, 2020, the disclosures of which are hereby incorporated by reference in their entireties.

BACKGROUND OF THE INVENTION

Field of the Invention

The proposed solution relates to a polyolefin composition comprising at least one polypropylene homopolymer and recycled plastic material, to an article comprising the polyolefin composition and a process for preparing such polyolefin composition.

DESCRIPTION OF RELATED ART

Polyolefins, in particular polyethylene and polypropylene are increasingly consumed in large amounts in a wide range of applications, including packaging for food and other goods, fibres, automotive components, and a great variety of manufactured articles. Polyethylene based materials are a particular problem as these materials are extensively used in packaging. Taking into account the huge amount of waste collected compared to the amount of waste recycled back into the stream, there is still a great potential for intelligent reuse of plastic waste streams and for mechanical recycling of plastic wastes.

Generally, recycled quantities of polypropylene on the market are mixtures of both polypropylene (PP) and polyethylene (PE), this is especially true for post-consumer waste streams. Moreover, commercial recyclates from post-consumer waste sources are conventionally cross-contaminated with non-polyolefin materials such as polyethylene terephthalate, polyamide, polystyrene or non-polymeric substances like wood, paper, glass or aluminum. These cross-contaminations drastically limit final applications of recycling streams such that no profitable final uses remain. Polyolefinic recycling materials, especially from post-consumer waste streams, are a mixture of PE and PP. The better the quality of the recyclate is, the less available it is and the more expensive it is.

Customers that are asking for recyclates require similar stiffness-impact strength as virgin ones. This is also valid for reinforced glass fibre compounds for structural products. The quality issue in recyclates compared to the virgin ones can be to some extent overcome by reinforcing the recyclates, where the reinforcement particles physically bond the dissimilar domains (PP and PE).

Compositions comprising virgin polymers (i.e. polymers used for the first time) and recycled mixed plastics have been studied.

WO 2014167493 A1 describes a process for the preparation of a polyolefin mixture comprising the step (a) of mixing together a base polymeric mixture MB and a polymeric mixture MPR, wherein said mixture MPR is obtained from the recycling of post-consumer plastic materials.

Recycled mixed plastics reinforced with glass fibre (GF) have also been studied. For example, recycled PP or PP/PE mixtures have been reinforced with GF or a hybrid GF with other fillers.

EP 2845876 B1 describes a composition containing two or more resins and a glass fiber, comprising: a resin mixture comprising waste polyethylene (PE) and waste polypropylene (PP); a long glass fiber with a length of 10 mm or greater; and a rubber-based resin, wherein the composition comprises, based on 100 parts by weight of the resin mixture, 3-30 parts by weight of the long glass fiber, 10-50 parts by weight of the rubber-based resin, and 10-35 parts by weight of LDPE.

EP 3406662 A1 describes structurally-reinforced plastic composite products produced with recycled waste glass fibers and recycled polymer compounds and process for making the same. The reinforced composite article, comprises: a recycled fiberglass collected from waste streams and functioning as a filler, the recycled fiberglass being 30-70% of a total weight of the reinforced composite article; a colorant of 1-2% of the total weight of the reinforced composite article; and a recycled resin collected from the waste streams and substantially wetting-out the recycled glass fiber by the black colorant and a chemical binder. The recycled resin comprises at least one of high density polyethylene (HDPE), polypropylene (PP) or an engineering grade resin.

Bajracharya et al. (Experimental and theoretical studies on the properties of injection moulded glass fibre reinforced mixed plastics composites." Composites Part A: Applied Science and Manufacturing, 2016, 84: 393-405) and Bajracharya, et al. (Durability characteristics and property prediction of glass fibre reinforced mixed plastics composites." Composites Part B: Engineering, 2017, 116: 16-29) use PE/PP recyclate in the form of flakes by Repeat Plastics (Replas) Pty of Australia which was collected from post-consumer and post-industrial plastic waste. The recyclate had tensile modulus of 906 MPa. They were reinforced with 10, 20 and 30% GF (length of 4.0 mm and diameter of 13.7 μm). A maximum tensile modulus of 3068 MPa was achieved by 30% GF.

Thus, there are examples of reinforced recyclates with a good tensile modulus and impact strength at the same time. However, it would be of an advantage to provide polyolefin compositions having similar properties as virgin polymers, but comprise also post-consumer recyclate (PCR) to make the final solutions more economically friendly in regard to $CO_2$ footprint.

SUMMARY OF THE INVENTION

Thus, it is an object underlying the proposed solution to provide a polyolefin composition comprising polyolefin material recovered from waste plastic material with an improved stiffness-impact strength balance.

This object has been solved by providing a polyolefin composition comprising:

a) 30-60 wt % (based on the overall weight of the polymer composition) of at least one polypropylene homopolymer, b) 15-40 wt % (based on the overall weight of the polymer composition) of a blend (A) of recycled plastic material comprising polypropylene and polyethylene in a ratio between 3:7 and 10:1, which is recovered from a waste plastic material derived from post-consumer and/or post-industrial waste having a melt flow rate $MFR_2$ (230° C., 2.16 kg, measured according to ISO 1133) in the range of 8-14 g/10 min, c) 17-50 wt % (based on the overall weight of the polymer composition) of glass fibers;

d) 0.5-2.5 wt % (based on the overall weight of the polymer composition) of at least one coupling agent, and optionally further additives, wherein the sum of all ingredients add always up to 100 wt %, wherein the polyolefin composition has a melt flow rate $MFR_2$ (230° C., 2.16 kg, measured according to ISO 1133) of at least 2 g/10 min;

a tensile modulus (measured according to ISO 527-2, 23° C.), of at least 4 GPa and an impact strength (Charpy 1eA +23° C.) of at least 5 $kJ/m^2$.

The present recyclate containing composition is characterized by a high tensile modulus combined with a high impact strength. The performance of the combination of the different kinds of polymers and recyclates with glass fiber reinforcement is not easily predictable. It is in particular difficult to predict a tensile modulus due to the interaction between the various components. In addition recyclate polyolefins are typically contaminated with polar polymers (e.g. PA, PET) or other non-POs such as PS or fillers etc., which make an obvious calculation of the final mechanical performance more difficult.

As discussed in detail further below the melt flow rate of the present polyolefin composition can cover a wide spectrum and can be adjusted according to customer need. The melt flow rate is an important indicator for the flow in the mold. Changes of melt flow rate have implications for conversion interface and for end-use performance. By providing polyolefin compositions with different melt flow rates customer needs can be meet.

It is to be understood that the present polyolefin composition does not contain rubber and is essentially free of peroxides, preferably the peroxide content based on the total weight of the polymer composition is below 0.5 wt.-%.

For the purposes of the present description and of the subsequent claims, the term "recycled" is used to indicate that the material is recovered from post-consumer waste and/or industrial waste. Namely, post-consumer waste refers to objects having completed at least a first use cycle (or life cycle), i.e. having already served their first purpose and been through the hands of a consumer; while industrial waste refers to the manufacturing scrap which does normally not reach a consumer. In the gist of the solution "recycled polymers" may also comprise up to 17 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

As described also further below, typical other components originating from the first use are thermoplastic polymers, like polystyrene and PA 6, talc, chalk, ink, wood, paper, limonene and fatty acids. The content of polystyrene (PS) and polyamide 6 (PA 6) in recycled polymers can be determined by Fourier Transform Infrared Spectroscopy (FTIR) and the content of talc, chalk, wood and paper may be measured by Thermogravimetric Analysis (TGA).

The term "virgin" denotes the newly produced materials and/or objects prior to first use and not being recycled. In case that the origin of the polymer is not explicitly mentioned the polymer is a "virgin" polymer.

As described further below more than one polypropylene homopolymer may be used in the polyolefin composition. It is also possible to add at least one heterophasic polypropylene copolymer to the present polyolefin composition.

The total amount of all virgin polypropylene polymers (homopolymers and heterophasic polymers) used in the present polyolefin composition adds up according to the solution to a range between 30-60 wt %, preferably between 30-50 wt %, more preferably between 35-45 wt %, even more preferably between 37-40 wt % (based on the overall weight of the polymer composition).

The amount of the blend (A) of recycled plastic material comprising polypropylene and polyethylene in a ratio between 3:7 and 10:1, which is recovered from a waste plastic material derived from post-consumer and/or post-industrial waste, used in the present polyolefin composition is according to the solution in a range between 15-40 wt %, preferably between 25-40 wt %, more preferably between 30-40 wt % (based on the overall weight of the polymer composition).

The amount of glass fibers used in the present polyolefin composition is according to the solution in a range between 17-50 wt %, preferably 20-50 wt %, more preferably between 20-40 wt %, still more preferably between 20-30 wt % (based on the overall weight of the polymer composition).

The amount of the at least one coupling agent used in the present polyolefin composition is according to the solution in a range between 0.5-2.5 wt %, preferably 1-2 wt % (based on the overall weight of the polymer composition).

It is to be understood that further additives may also be included in the polyolefin composition and the sum of all ingredients add always up to 100 wt % in each of the embodiments described herein.

According to an embodiment the present polyolefin composition comprises a) 30-50 wt % (based on the overall weight of the polymer composition) of at least one polypropylene homopolymer, b) 15-40 wt % (based on the overall weight of the polymer composition) of the blend (A) of recycled plastic material comprising polypropylene and polyethylene having a melt flow rate $MFR_2$ (230° C., 2.16 kg, measured according to ISO 1133) in the range of 8-14 g/10 min, preferably of 10-12 g/10 min, c) 17-50 wt %, preferably 20 to 50 wt % (based on the overall weight of the polymer composition) of glass fibers;

d) 0.5-2.5 wt % (based on the overall weight of the polymer composition) of the at least one coupling agent, and optionally further additives, wherein the sum of all ingredients add always up to 100 wt %.

In one further embodiment the present polyolefin composition comprises a1) at least one first polypropylene homopolymer;

a2) at least one second polypropylene homopolymer;

wherein the at least one first polypropylene homopolymer, and the at least one second polypropylene homopolymer differ from each other in their melt flow rate $MFR_2$ (230° C., 2.16 kg load, measured according to ISO 1133), b) a blend (A) of recycled plastic material comprising polypropylene and polyethylene in a ratio between 3:7 and 10:1, which is recovered from a waste plastic material derived from post-consumer and/or post-industrial waste;

c) glass fibers; and d) at least one coupling agent;

Thus, the present polyolefin composition may comprise two virgin polypropylene homopolymers with different melt flow rates. This allows for an adjustment of the melt flow rate of the final polyolefin composition.

Such a polyolefin with two virgin polypropylene homopolymers may comprise a1) 20-40 wt % of a first polypropylene homopolymer;
a2) 10-20 wt % of a second polypropylene homopolymer;
b) 15-40 wt % of the blend (A) of recycled plastic material comprising polypropylene and polyethylene having a melt flow rate $MFR_2$ (230° C., 2.16 kg, measured according to ISO 1133) in the range of 8-14 g/10 min, preferably 10-12 g/10 min,
c) 17-50 wt %, preferably 20-50 wt % of glass fibers;
d) 0.5-2.5 wt % at the at least one coupling agent; and optionally further additives, wherein the sum of all ingredients add always up to 100 wt %.

In one further embodiment the present polyolefin composition comprises a1) at least one first polypropylene homopolymer;
a2) at least one second polypropylene homopolymer;
a3) at least one third polypropylene homopolymer;

wherein the at least one first polypropylene homopolymer, the at least one second polypropylene homopolymer and the at least one third polypropylene homopolymer differ from each other in their melt flow rate $MFR_2$ (230° C., 2.16 kg load, measured according to ISO 1133), b) a blend (A) of recycled plastic material comprising polypropylene and polyethylene in a ratio between 3:7 and 10:1, which is recovered from a waste plastic material derived from post-consumer and/or post-industrial waste;
c) glass fibers; and
d) at least one coupling agent.

Thus, the present polyolefin composition may comprise three virgin polypropylene homopolymers with different melt flow rates. This allows for an even more precise adjustment of the melt flow rate of the final polyolefin composition.

Such a polyolefin with three virgin polypropylene homopolymers may comprise and preferably consists of the following components:

a1) 15-30 wt % of the first polypropylene homopolymer;
a2) 10-20 wt % of the second polypropylene homopolymer;
a3) 5-10 wt % of the third polypropylene homopolymer;
b) 15-40 wt % of the blend (A) of recycled plastic material comprising polypropylene and polyethylene having a melt flow rate $MFR_2$ (230° C., 2.16 kg, measured according to ISO 1133) in the range of 10-12 g/10 min,
c) 17-50 wt %, preferably 20-50 wt % of glass fibers;
d) 0.5-2.5 wt % at the at least one coupling agent; and optionally further additives, wherein the sum of all ingredients add always up to 100 wt %.

It is to be understood that also more than three virgin polypropylene homopolymers, like four or five, may be used in the present polyolefin composition.

The polypropylene homopolymers used as virgin polymers in the present polyolefin composition are selected from a group comprising at least one polypropylene homopolymer (PPH-1) having a melt flow rate $MFR_2$ (230° C., 2.16 kg, measured according to ISO 1133) in the range of 5 to 15 g/10 min, preferably of 5 to 10 g/10 min, more preferably of 8 g/10 min;

at least one polypropylene homopolymer (PPH-2) having a melt flow rate $MFR_2$ (230° C., 2.16 kg, measured according to ISO 1133) in the range of range of 10 to 30 g/10 min, preferably of 15 to 25 g/10 min, more preferably of 20 g/10 min;

at least one polypropylene homopolymer (PPH-3) having a melt flow rate $MFR_2$ (230° C., 2.16 kg, measured according to ISO 1133) in the range of 60 to 100 g/10 min, preferably of 70 to 80 g/10 min, more preferably of 75 g/10 min;

at least one polypropylene homopolymer (PPH-4) having a melt flow rate $MFR_2$ (230° C., 2.16 kg, measured according to ISO 1133) in the range of 100 to 150 g/10 min, preferably of 110 to 130 g/10 min, more preferably of 125 g/10 min;

at least one polypropylene homopolymer (PPH-5) having a melt flow rate $MFR_2$ (230° C., 2.16 kg, measured according to ISO 1133) in the range of 600 to 1000 g/10 min, preferably of 700 to 900 g/10 min, preferably of 800 g/10 min;

at least one polypropylene homopolymer (PPH-6) having a melt flow rate $MFR_2$ (230° C., 2.16 kg, measured according to ISO 1133) in the range of 1.5 g/10 min, preferably in the range between 0.15 to 0.5 g/10 min, more preferably of 0.3 to 0.45 g/10 min, even more, more preferably of 0.2 g/10 min.

Polypropylene Virgin Polymers

The properties and features of the different polypropylene homopolymers that may be used in the present polyolefin composition are described in the following.

Polypropylene Homopolymer (PPH-1)

The at least one polypropylene homopolymer (PPH-1) has a melt flow rate $MFR_2$ (230° C., 2.16 kg, measured according to ISO 1133) in the range of 5 to 15 g/10 min, preferably of 5 to 10 g/10 min, more preferably of 8 g/10 min; and a stiffness of higher than 1300 MPa.

The polypropylene homopolymer (PPH-1) has a melting temperature of at least 150° C.; preferably of at least 158° C., preferably in the range of 158 to 167° C., like 162° C. The polypropylene homopolymer (PPH-1) may have a flexural modulus measured according to ISO 178 of at least 500 MPa, preferably at least 1000 MPa, preferably in the range of 1200 to 2000 MPa, like 1400 MPa.

A preferred material for polypropylene homopolymer (PPH-1) is inter alia commercially available from Borealis AG (Austria) under the trade name HD601CF. Alternative suitable materials are high crystallinity polypropylene homopolymers as described for example in WO 03/031174 A2.

Polypropylene Homopolymer (PPH-2)

The at least one polypropylene homopolymer (PPH-2) has a melt flow rate $MFR_2$ (230° C., 2.16 kg, measured according to ISO 1133) in the range of 10 to 30 g/10 min, preferably of 15 to 25 g/10 min, preferably of 20 g/10 min; and a stiffness of higher than 1800 MPa.

The polypropylene homopolymer (PPH-2) consists substantially, i.e. of more than 99.7 wt %, still more preferably of at least 99.8 wt %, of propylene units, based on the weight of the propylene homopolymer (PPH-2). In a preferred embodiment only propylene units are detectable in the propylene homopolymer (PPH-2).

It is appreciated that the polypropylene homopolymer (PPH-2) features a low amount of xylene cold soluble (XCS) fraction. The polypropylene homopolymer (PPH-2) may have an amount of xylene cold solubles (XCS) fraction of not more than 4.0 wt %, preferably not more than 3.0 wt %, more preferably not more than 2.5 wt %, like in the range of 0.1 to 4.0 wt %, preferably in the range of 0.1 to 3.0 wt %, more preferably in the range from 0.1 to 2.5 wt %, based on the weight of the polypropylene homopolymer (PPH-2).

The polypropylene homopolymer (PPH-2) may have a heat deflection temperature (HDT) measured according to according to ISO 75-2 of at least 90° C. preferably at least 100° C., more preferably at least 115° C., like in the range of 90 to 160° C., preferably in the range of 100 to 150° C., more preferably 115 to 130° C.

The polypropylene homopolymer (PPH-2) may have a Charpy Impact Strength measured according to ISO 179-1eA:2000 at 23° C. of at least 1.0 kJ/$m^2$, preferably, at least 2.0 kJ/$m^2$, like in the range of 1.0 to 10 kJ/$m^2$, preferably in the range of 2.0 to 5.0 kJ/$m^2$, like 2.5 kJ/$m^2$. The polypropylene homopolymer (PPH-2) may have a flexural modulus measured according to ISO 178 of at least 500 MPa, preferably at least 1500 MPa, like in the range of 500 to 3500 MPa, preferably in the range of 1500 to 2500 MPa, like 2000 MPa.

The polypropylene homopolymer (PPH-2) may comprise a nucleating agent, which is preferably a polymeric nucleating agent, more preferably an alpha-nucleating agent, e.g. a polymeric alpha-nucleating agent. The alpha-nucleating agent content of the polypropylene homopolymer (PPH-2), is preferably up to 5.0 wt %. In a preferred embodiment, the polypropylene homopolymer (PPH-2) contains not more than 3000 ppm, more preferably of 1 to 2000 ppm of alpha-nucleating agent.

The polypropylene homopolymer (PPH-2) is known in the art and commercially available. A suitable example is HF955MO of Borealis AG.

Polypropylene Homopolymer (PPH-3)

The at least one polypropylene homopolymer (PPH-3) has a melt flow rate $MFR_2$ (230° C., 2.16 kg, measured according to ISO 1133) in the range of 60 to 100 g/10 min, preferably in the range of 70 to 80 g/10 min, even more preferably of 75 g/10 min; and a stiffness of higher than 1300 MPa.

The polypropylene homopolymer (PPH-3) consists substantially, i.e. of more than 99.7 wt %, still more preferably of at least 99.8 wt %, of propylene units, based on the weight of the polypropylene homopolymer (PPH-3). In a preferred embodiment only propylene units are detectable in the polypropylene homopolymer (PPH-3).

It is appreciated that the polypropylene homopolymer (PPH-3) features a low amount of xylene cold soluble (XCS) fraction. The polypropylene homopolymer (PPH-3) may have an amount of xylene cold solubles (XCS) fraction of not more than 4.0 wt %, preferably not more than 3.5 wt %, like in the range of 0.1 to 4.0 wt %, preferably in the range of 0.1 to 3.5 wt %, based on the weight of the polypropylene homopolymer (PPH-3).

The polypropylene homopolymer (PPH-3) may have a heat deflection temperature (HDT) measured according to according to ISO 75-2 of at least 50° C., preferably at least 60° C., more preferably at least 75° C., like in the range of 50 to 120° C., preferably in the range of 60 to 100° C., more preferably 75 to 90° C.

The polypropylene homopolymer (PPH-3) may have a Charpy Notched Impact Strength (NIS) measured according to ISO 179-1 eA at 23° C. of at least 0.5 kJ/$m^2$, preferably, at least 0.7 kJ/$m^2$, like in the range of 0.5 to 1.5 kJ/$m^2$, preferably in the range of 0.7 to 1.3 kJ/$m^2$, like 1.0 kJ/$m^2$. The polypropylene homopolymer (PPH-3) may have a flexural modulus measured according to ISO 178 of at least 500 MPa, preferably at least 1000 MPa, like in the range of 500 to 2500 MPa, preferably in the range of 1000 to 2000 MPa, like 1500 MPa.

In case the polypropylene homopolymer (PPH-3) comprises an alpha-nucleating agent it is appreciated that the polypropylene homopolymer (PPH-3) may comprise the alpha-nucleating agent in an amount of up to 5.0 wt %, based on the weight of the polypropylene homopolymer (PPH-3), preferably up to 3000 ppm, like in the range of 1 to 2000 ppm. However, in a preferred embodiment the polypropylene homopolymer (PPH-2) does not comprise any nucleating agent, i.e. the polypropylene homopolymer (PPH-2) is not nucleated.

The polypropylene homopolymer (PPH-3) is known in the art and commercially available. A suitable example is HJ120UB of Borealis AG.

Polypropylene Homopolymer (PPH-4)

The at least one polypropylene homopolymer (PPH-4) has a melt flow rate $MFR_2$ (230° C., 2.16 kg, measured according to ISO 1133) in the range of 100 to 150 g/10 min, preferably of 110 to 130 g/10 min, more preferably of 125 g/10 min.

The polypropylene homopolymer (PPH-4) may have a Charpy Notched Impact Strength (NIS) measured according to ISO 179-1 eA at 23° C. of at least 0.5 kJ/$m^2$, preferably, at least 0.7 kJ/$m^2$, like in the range of 0.5 to 1.5 kJ/$m^2$, preferably in the range of 0.7 to 1.3 kJ/$m^2$, like 1.0 kJ/$m^2$. The polypropylene homopolymer (PPH-3) may have a flexural modulus measured according to ISO 178 of at least 500 MPa, preferably at least 1000 MPa, like in the range of 500 to 2500 MPa, preferably in the range of 1000 to 2000 MPa, like 1550 MPa.

The polypropylene homopolymer (PPH-4) is known in the art and commercially available. A suitable example is HK060AE of Borealis AG.

Polypropylene Homopolymer (PPH-5)

The at least one polypropylene homopolymer (PPH-5) has a melt flow rate $MFR_2$ (230° C., 2.16 kg, measured according to ISO 1133) in the range of 600 to 1000 g/10 min, preferably of 700 to 900 g/10 min, preferably of 800 g/10 min;

The polypropylene homopolymer (PPH-5) has a melting temperature of at least 140° C.; preferably of at least 150° C., preferably in the range of 150 to 160° C., like 158° C.

The polypropylene homopolymer (PPH-5) is known in the art and commercially available. A suitable example is HL708FB of Borealis AG.

Polypropylene Homopolymer (PPH-6)

The at least one polypropylene homopolymer (PPH-6) has a melt flow rate $MFR_2$ (230° C., 2.16 kg, measured according to ISO 1133) of 1.5 g/10 min, preferably in the range between 0.15 to 0.5 g/10 min, more preferably of 0.3 to 0.45 g/10 min, even more preferably of 0.2 g/10 min; and a stiffness of higher than 1300 MPa, Generally, the high molecular weight linear polypropylene homopolymer (PPH-6) has a weight average molecular weight ($M_w$) of at least 750 kg/mol. Preferably, the high molecular weight linear polypropylene homopolymer (PPH-6) has a weight average molecular weight ($M_w$) in the range of 750 to 2000 kg/mol, more preferably in the range of 800 to 1500 kg/mol.

The polypropylene homopolymer (PPH-6) may have a Charpy Notched Impact Strength (NIS) measured according to ISO 179-1 eA at 23° C. in the range of 5-10 kJ/$m^2$, preferably of 7 kJ/$m^2$. The polypropylene homopolymer (PPH-6) may have a tensile modulus measured according to ISO 527-2 of at least 1000 MPa, preferably at least 1500 MPa, more preferably in the range of 1000 to 2000 MPa, like 1650 MPa.

The polypropylene homopolymer (PPH-6) is known in the art and commercially available. A suitable example is BE50 of Borealis AG.

In yet another preferred embodiment the present polyolefin composition may comprise—in addition to at least one of the polypropylene homopolymers—at least one heterophasic polypropylene copolymer. Heterophasic polypropylene copolymers comprise as polymer components a polypropylene matrix and an elastomeric copolymer.

In one further embodiment the present polyolefin composition comprises a1) at least one first polypropylene homopolymer;

a2) optionally at least one second polypropylene homopolymer;

wherein the at least one first polypropylene homopolymer and the optionally at least one second polypropylene homopolymer differ from each other in their melt flow rate $MFR_2$ (230° C., 2.16 kg load, measured according to ISO 1133), a4) at least one heterophasic polypropylene copolymer;

b) a blend (A) of recycled plastic material comprising polypropylene and polyethylene in a ratio between 3:7 and 10:1, which is recovered from a waste plastic material derived from post-consumer and/or post-industrial waste;

c) glass fibers; and d) at least one coupling agent.

Such a polyolefin with one or two virgin polypropylene homopolymers and at least one heterophasic polypropylene copolymer may comprise and preferably consists of the following components:

a1) 15-30 wt % of the first polypropylene homopolymer;

a2) optionally 10-20 wt % of the second polypropylene homopolymer;

a4) 10-20 wt % of the heterophasic polypropylene homopolymer;

b) 15-40 wt % of the blend (A) of recycled plastic material comprising polypropylene and polyethylene having a melt flow rate $MFR_2$ (230° C., 2.16 kg, measured according to ISO 1133) in the range of 10-12 g/10 min, c) 20-50 wt % of glass fibers;

d) 0.5-2.5 wt % at the at least one coupling agent; and optionally further additives, wherein the sum of all ingredients add always up to 100 wt %.

Such a heterophasic polypropylene copolymer may be at least one heterophasic polypropylene copolymer (PPHeco-1) having a melt flow rate $MFR_2$ (230° C., 2.16 kg, measured according to ISO 1133) in the range of 15 to 20 g/10 min, preferably of 18 g/10 min.

Heterophasic Polypropylene Copolymer (PPHeco-1)

The at least one heterophasic polypropylene copolymer (PPHeco-1) has a melt flow rate $MFR_2$ (230° C., 2.16 kg, measured according to ISO 1133) in the range of 15 to 25 g/10 min, preferably of 15 to 20 g/10 min, more preferably of 18 g/10 min.

The heterophasic polypropylene copolymer (PPHeco-1) may have a Charpy Notched Impact Strength (NIS) measured according to ISO 179-1 eA at 23° C. of at least 20 $kJ/m^2$, preferably, at least 30 $kJ/m^2$, like in the range of 20 to 50 $kJ/m^2$, preferably in the range of 30 to 40 $kJ/m^2$, like 35 $kJ/m^2$. The heterophasic polypropylene copolymer (PPHeco-1) may have a flexural modulus measured according to ISO 178 of at least 300 MPa, preferably at least 500 MPa, like in the range of 500 to 1500 MPa, preferably in the range of 500 to 1000 MPa, like 800 MPa.

The heterophasic polypropylene copolymer (PPHeco-1) is known in the art and commercially available. A suitable example is EF015AE of Borealis AG.

As mentioned previously, the melt flow rate of the present polyolefin composition can vary. Thus, the present polyolefin composition may have a melt flow rate $MFR_2$ (ISO 1133, 2.16 kg, 230° C., measured according to ISO 1133) in the range between 2 and 20 g/10 min, preferably between 3 and 17 g/10 min, more preferably between 5 and 15 g/10 min, even more preferably between 10 and 15 g/10 min.

In one embodiment, the present polyolefin composition has a tensile modulus (ISO 527-2), of at least 4.0 GPa, preferably of at least 4.5 GPa; more preferably of at least 5.5 GPa, preferably of at least 6 GPa, more preferably at least 6.5 GPa, even more preferably at least 6.8 GPa, in particular in a range between 4 and 14 GPa, more in particular in a range between 4.5 and 12 GPa.

In a further embodiment the present polyolefin composition has an impact strength (ISO179; Charpy 1eA +23° C.) of at least 5.0 $kJ/m^2$, preferably of at least 6.0 $kJ/m^2$, more preferably at least 7 $kJ/m^2$, still more preferably of at least 7.5 $kJ/m^2$, more preferably of at least 8 $kJ/m^2$, even more preferably of at least 8.5 $kJ/m^2$, in particular in a range between 5.0 and 12.0 $kJ/m^2$, more in particular in a range between 5.5 and 10 $kJ/m^2$.

In the following, more specific embodiments of the present composition are described.

In a first embodiment a polyolefin composition is provided that comprises a1) 30-40 wt % (based on the overall weight of the polymer composition) of at least one polypropylene homopolymer (PPH-1) having a melt flow rate $MFR_2$ (230° C., 2.16 kg, measured according to ISO 1133) in the range of 5 to 15 g/10 min, preferably of 5 to 10 g/10 min, more preferably of 8 g/10 min, b) 30-40 wt % (based on the overall weight of the polymer composition) of the blend (A) of recycled plastic material comprising polypropylene and polyethylene having a melt flow rate $MFR_2$ (230° C., 2.16 kg, measured according to ISO 1133) in the range of 8-14 g/10 min, preferably of 10-12 g/10 min, c) 17-30 wt %, preferably 20-30 wt % (based on the overall weight of the polymer composition) of glass fibers;

d) 1-2 wt % (based on the overall weight of the polymer composition) of the at least one coupling agent, and optionally further additives, wherein the sum of all ingredients add always up to 100 wt %, Such a first polyolefin composition may have a melt flow rate $MFR_2$ (230° C., 2.16 kg, measured according to ISO 1133) in the range of 2-5 g/10 min; preferably in the range of 3.5-5 g/10 min, more preferably in the range of 4-4.5 g/10 min;

a tensile modulus (ISO 527-2) of at least 6 GPa, preferably at least 6.5 GPa, preferably at least 6.7 GPa, more preferably at least 6.8 GPa, and even more preferably at least 6.9 GPa, and an impact strength (Charpy 1eA +23° C.) of at least 8 $kJ/m^2$, preferably of at least 8.2 $kJ/m^2$, preferably of at least 8.4 $kJ/m^2$, more preferably at least 8.5 $kJ/m^2$.

In a second embodiment a polyolefin composition is provided that comprises a1) 30-50 wt % of at least one propylene homopolymer (PPH-1) having a melt flow rate $MFR_2$ (230° C., 2.16 kg, measured according to ISO 1133) in the range of 6-12 g/10 min, preferably of 8 g/10 min;

a2) 15-20 wt % of least one propylene homopolymer (PPH-6) having a melt flow rate $MFR_2$ (230° C., 2.16 kg, measured according to ISO 1133) of ≤1.5 g/10 min; preferably in the range of 0.15 and 0.5, more preferably of 0.2 g/10 min;

b) 25-40 wt % of the blend (A) of recycled plastic material comprising polypropylene and polyethylene having a melt flow rate $MFR_2$ (230° C., 2.16 kg, measured according to ISO 1133) in the range of 10-12 g/10 min, c) 17-30 wt %, preferably 20-30 wt % of glass fibers;

d) 0.5-2.0 wt %, in particular 1 wt % at the at least one coupling agent, and optionally further additives, wherein the sum of all ingredients add always up to 100 wt %, Such a second polyolefin composition may have a melt flow rate $MFR_2$ (230° C., 2.16 kg, measured according to ISO 1133) in the range of 2-3 g/10 min, preferably 2-2.5 g/10 min;

a tensile modulus (ISO 527-2) of at least 4.5 GPa, preferably of at least 4.7 GPa, more preferably at least 4.8 GPa, and an impact strength (Charpy 1eA +23° C.) of at least 7 $kJ/m^2$, preferably of at least 7.5 $kJ/m^2$, preferably of at least 7.6 $kJ/m^2$, more preferably at least 7.8 $kJ/m^2$, even more preferably of at least 7.9 $kJ/m^2$.

In a third embodiment a polyolefin composition is provided that comprises a1) 20-40 wt % of at least one polypropylene homopolymer (PPH-2) having a melt flow rate $MFR_2$ (230° C., 2.16 kg, measured according to ISO 1133) in the range of range of 10 to 30 g/10 min, preferably of 15 to 25 g/10 min, more preferably of 20 g/10 min;

a2) 8-20 wt % of at least one polypropylene homopolymer (PPH-5) having a melt flow rate $MFR_2$ (230° C., 2.16 kg, measured according to ISO 1133) in the range of 600 to 1000 g/10 min, preferably of 700 to 900 g/10 min, preferably of 800 g/10 min;

b) 30-40 wt % of the blend (A) of recycled plastic material comprising polypropylene and polyethylene having a melt flow rate $MFR_2$ (230° C., 2.16 kg, measured according to ISO 1133) in the range of 10-12 g/10 min;

c) 17-30 wt %, preferably 20-30 wt % of glass fibers;

d) 1-2.0 wt % of at the at least one coupling agent, and optionally further additives, wherein the sum of all ingredients add always up to 100 wt %, Such a third polyolefin composition may have a melt flow rate $MFR_2$ (230° C., 2.16 kg, measured according to ISO 1133) in the range of 15-20 g/10 min, preferably 17-18 g/10 min;

a tensile modulus (ISO 527-2) of at least 6.5 GPa, preferably of at least 4.7 GPa, more preferably at least 4.8 GPa, and an impact strength (Charpy 1eA +23° C.) of at least 6.0 $kJ/m^2$, preferably of at least 6.2 $kJ/m^2$.

In a fourth embodiment a polyolefin composition is provided that comprises a1) 10-20 wt % of at least one polypropylene homopolymer (PPH-2) having a melt flow rate $MFR_2$ (230° C., 2.16 kg, measured according to ISO 1133) in the range of range of 10 to 30 g/10 min, preferably of 15 to 25 g/10 min, more preferably of 20 g/10 min;

a2) 20-40 wt % of at least one polypropylene homopolymer (PPH-4) having a melt flow rate $MFR_2$ (230° C., 2.16 kg, measured according to ISO 1133) in the range of 100 to 150 g/10 min, preferably of 110 to 130 g/10 min, more preferably of 125 g/10 min;

b) 30-40 wt % of the blend (A) of recycled plastic material comprising polypropylene and polyethylene having a melt flow rate $MFR_2$ (230° C., 2.16 kg, measured according to ISO 1133) in the range of 10-12 g/10 min, c) 17-30 wt %, preferably 20-30 wt % of glass fibers;

d) 1-2.0 wt % of at the at least one coupling agent, and optionally further additives, wherein the sum of all ingredients add always up to 100 wt %.

Such a fourth polyolefin composition may have a melt flow rate $MFR_2$ (230° C., 2.16 kg, measured according to ISO 1133) in the range of 10-15 g/10 min, preferably 12-13 g/10 min;

a tensile modulus (ISO 527-2) of at least 6.5 GPa, preferably of at least 4.7 GPa, more preferably at least 4.8 GPa, and an impact strength (Charpy 1eA +23° C.) of at least 6.0 $kJ/m^2$, preferably of at least 6.3 $kJ/m^2$.

In a fifth embodiment a polyolefin composition is provided that comprises a1) 10-20 wt % of at least one polypropylene homopolymer (PPH-2) having a melt flow rate $MFR_2$ (230° C., 2.16 kg, measured according to ISO 1133) in the range of range of 10 to 30 g/10 min, preferably of 15 to 25 g/10 min, more preferably of 20 g/10 min;

a2) 15-30 wt % of at least one polypropylene homopolymer (PPH-3) having a melt flow rate $MFR_2$ (230° C., 2.16 kg, measured according to ISO 1133) in the range of 60 to 100 g/10 min, preferably of 70 to 80 g/10 min, more preferably of 75 g/10 min;

a3) 4-10 wt % of least one propylene homopolymer (PPH-6) having a melt flow rate $MFR_2$ (230° C., 2.16 kg, measured according to ISO 1133) of ≤1.5 g/10 min; preferably in the range of 0.15 and 0.5, more preferably of 0.2 g/10 min;

b) 25-40 wt % of the blend (A) of recycled plastic material comprising polypropylene and polyethylene having a melt flow rate $MFR_2$ (230° C., 2.16 kg, measured according to ISO 1133) in the range of 10-12 g/10 min, c) 17-20 wt %, preferably 20-30 wt % of glass fibers;

d) 1-2 wt % at the at least one coupling agent; and optionally further additives, wherein the sum of all ingredients add always up to 100 wt %.

Such a fifth polyolefin composition may have a melt flow rate $MFR_2$ (230° C., 2.16 kg, measured according to ISO 1133) in the range of 5-15 g/10 min, preferably 6-10 g/10 min;

a tensile modulus (ISO 527-2) of at least 4 GPa, preferably of at least 5 GPa, more preferably at least 6 GPa, even more preferably of at least 6.5 and an impact strength (Charpy 1eA +23° C.) of at least 6.0 $kJ/m^2$, preferably of at least 7 $kJ/m^2$, more preferably of at least 7.5 $kJ/m^2$.

In a sixth embodiment a polyolefin composition is provided that comprises a1) 20-30 wt % of at least one polypropylene homopolymer (PPH-4) having a melt flow rate $MFR_2$ (230° C., 2.16 kg, measured according to ISO 1133) in the range of 100 to 150 g/10 min, preferably of 110 to 130 g/10 min, more preferably of 125 g/10 min;

a4) 10-20 wt % of at least one heterophasic polypropylene copolymer (PPHeco-1) having a melt flow rate $MFR_2$ (230° C., 2.16 kg, measured according to ISO 1133) in the range of 15 to 20 g/10 min, preferably of 18 g/10 min, b) 25-40 wt % of the blend (A) of recycled plastic material comprising polypropylene and polyethylene having a melt flow rate $MFR_2$ (230° C., 2.16 kg, measured according to ISO 1133) in the range of 10-12 g/10 min, c) 17-30 wt %, preferably 20-30 wt % of glass fibers;

d) 1-2 wt % at the at least one coupling agent; and optionally further additives, wherein the sum of all ingredients add always up to 100 wt %.

Such a sixth polyolefin composition may have a melt flow rate $MFR_2$ (230° C., 2.16 kg, measured according to ISO 1133) in the range of 10-15 g/10 min, preferably 12-13 g/10 min;

a tensile modulus (ISO 527-2) of at least 4 GPa, preferably of at least 4.4 GPa, and an impact strength (Charpy 1eA +23° C.) of at least 6.0 kJ/$m^2$, preferably of at least 7 kJ/$m^2$, more preferably of at least 7.5 kJ/$m^2$.

In a seventh embodiment a polyolefin composition is provided that comprises a1) 10-20 wt % of at least one polypropylene homopolymer (PPH-2) having a melt flow rate $MFR_2$ (230° C., 2.16 kg, measured according to ISO 1133) in the range of range of 10 to 30 g/10 min, preferably of 15 to 25 g/10 min, more preferably of 20 g/10 min;

a2) 10-20 wt % of at least one polypropylene homopolymer (PPH-4) having a melt flow rate $MFR_2$ (230° C., 2.16 kg, measured according to ISO 1133) in the range of 100 to 150 g/10 min, preferably of 110 to 130 g/10 min, more preferably of 125 g/10 min;

a4) 8-12 wt % of at least one heterophasic polypropylene copolymer (PPHeco-1) having a melt flow rate $MFR_2$ (230° C., 2.16 kg, measured according to ISO 1133) in the range of 15 to 20 g/10 min, preferably of 18 g/10 min, b) 25-40 wt % of the blend (A) of recycled plastic material comprising polypropylene and polyethylene having a melt flow rate $MFR_2$ (230° C., 2.16 kg, measured according to ISO 1133) in the range of 10-12 g/10 min, c) 17-30 wt %, preferably 20-30 wt % of glass fibers;

d) 1-2 wt % at the at least one coupling agent; and optionally further additives, wherein the sum of all ingredients add always up to 100 wt %.

Such a seventh polyolefin composition may have a melt flow rate $MFR_2$ (230° C., 2.16 kg, measured according to ISO 1133) in the range of 5-15 g/10 min, preferably 10-13 g/10 min;

a tensile modulus (ISO 527-2) of at least 4 GPa, preferably of at least 4.5 GPa, and an impact strength (Charpy 1eA +23° C.) of at least 6.0 kJ/$m^2$, preferably of at least 7 kJ/$m^2$, more preferably of at least 7.2 kJ/$m^2$.

Blend A) of Recycled Material

Blend (A) is obtained from a recycled waste stream. Blend (A) can be either recycled post-consumer waste or industrial waste, such as for example from the automobile industry, or alternatively, a combination of both. It is particularly preferred that blend (A) consists of recycled post-consumer waste and/or industrial waste.

In one aspect blend (A) may be a polypropylene (PP) rich material of recycled plastic material that comprises significantly more polypropylene than polyethylene. Recycled waste streams, which are high in polypropylene can be obtained for example from the automobile industry, particularly as some automobile parts such as bumpers are sources of fairly pure polypropylene material in a recycling stream or by enhanced sorting. The PP rich material may be obtainable by selective processing, degassing and filtration and/or by separation according to type and colors such as NIR or Raman sorting and VIS sorting. It may be obtained from domestic waste streams (i.e. it is a product of domestic recycling) for example the "yellow bag" recycling system organized under the "Green dot" organization, which operates in some parts of Germany.

Preferably, the polypropylene rich recycled material is obtained from recycled waste by means of plastic recycling processes known in the art. Such PP rich recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polypropylene rich recycled materials include: Purpolen®PP (Mtm Plastics GmbH), Axpoly® recycled polypropylene pellets (Axion Ltd) and PolyPropylene Copolymer (BSP Compounds). It is considered that the solution could be applicable to a broad range of recycled polypropylene materials or materials or compositions having a high content of recycled polypropylene. The polypropylene-rich recycled material may be in the form of granules.

PP rich blend (A) may have a relative amount of units derived from propylene of greater than 50 wt %, preferably greater than 53 wt %, more preferably greater than 60 wt %, more preferably greater than 70 wt %, more preferably greater than 75 wt %, more preferably greater than 80 wt %, still more preferably greater than 90 wt % and even more preferably greater than 95 wt % with respect to the total weight of the composition.

It is to be understood that the PP present in the PP rich blend is preferably an isotactic polypropylene. In an embodiment the PP rich blend (A) preferably may have content of isotactic polypropylene of 50 wt %-80 wt %, with respect to the total weight of blend (A).

Furthermore, PP rich blend (A) may have a relative amount of units derived from ethylene of less than 47 wt %, more preferably less than 40 wt %, more preferably less than 30 wt %, more preferably less than 20 wt %, most preferably less than 10 wt %. Usually, the relative amount of units derived from ethylene is more than 5 wt % with respect to the total weight of the composition. It is to be understood that the ethylene present is preferably ethylene derived from polyethylene and ethylene containing copolymers.

The polyethylene fraction of the recycled material can comprise recycled high-density polyethylene (rHDPE), recycled medium-density polyethylene (rMDPE), recycled low-density polyethylene (rLDPE), linear low density polyethylene (LLDPE) and the mixtures thereof. In a certain embodiment, the recycled material is high density PE with an average density of greater than 0.8 g/$cm^3$, preferably greater than 0.9 g/$cm^3$, most preferably greater than 0.91 g/$cm^3$.

Blend (A) may also have a relative amount of polystyrene of between 0 and 5.0 wt %, preferably between 0.5 and 4.0 wt %, more preferably between 1.0 and 3.0 wt %, most preferably between 1.5 and 2.5 wt %.

According to the solution, blend (A) has a content of limonene as determined using solid phase microextraction (HS-SPME-GC-MS) of 0.1 ppm to 100 ppm, more preferably from 1 ppm to 50 ppm, most preferably from 2 ppm to 35 ppm. Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams.

The fatty acid content is yet another indication of the recycling origin of blend (A). However, in some cases, the fatty acid content may be below the detection limit due to specific treatments in the recycling process. According to the solution, blend (A) preferably has a content of fatty acids as determined using solid phase microextraction (HS-SPME-GC-MS) of from 1 ppm to 200 ppm, preferably from 1 ppm to 150 ppm, more preferably from 2 ppm to 100 ppm, most preferably from 3 ppm to 80 ppm.

In a preferred aspect, blend (A) (i) contains less than 5 wt %, preferably less than 1.5 wt % polystyrene; and/or (ii) contains less than 3.5 wt %, preferably less than 1 wt % talc; and/or (iii) contains less than 1.0 wt %, preferably less than 0.5 wt % polyamide.

Due to the recycling origin blend (A) may also contain: organic fillers, and/or inorganic fillers, and/or additives in amounts of up to 10 wt %, preferably 3 wt % with respect to the weight of blend (A).

Thus, in an embodiment the present polyolefin composition blend (A) of recycled plastic material comprises A-1) a content of polypropylene of 50-99 wt %,
A-2) a content of polyethylene of 2-40 wt %,
A-3) 0 to 5.0 wt % of polystyrene and/or copolymers such as ABS,
A-4) 0 to 3.0 wt % stabilizers,
A-5) 0 to 4.0 wt % polyamide-6,
A-6) 0 to 3.0 wt % talc,
A-7) 0 to 3.0 wt % chalk,
A-8) 0 to 1.0 wt % paper,
A-9) 0 to 1.0 wt % wood,
A-10) 0 to 0.5 wt % metal,
A-11) 0.1 ppm to 100 ppm of limonene as determined by using solid phase microextraction (HS-SPME-GC-MS), and
A-12) 0 to 200 ppm total fatty acid content as determined by using solid phase microextraction (HS-SPME-GC-MS)

wherein all amounts are given with respect to the total weight of blend (A).

As stated above blend (A) may include one or more further components, selected from:

A-4) up to 3.0 wt % stabilizers, preferably up to 2.0 wt % stabilizers,
A-5) up to 4.0 wt % polyamide-6, preferably up to 2.0 wt % polyamide-6,
A-6) up to 3.0 wt % talc, preferably up to 1.0 wt % talc,
A-7) up to 3.0 wt % chalk, preferably up to1.0 wt % chalk,
A-8) up to 1.0 wt % paper, preferably up to 0.5 wt % paper,
A-9) up to 1.0 wt % wood, preferably up to 0.5 wt % wood, and
A-10) up to 0.5 wt % metal, preferably up to 0.1 wt % metal, based on the overall weight of blend (A).

Blend (A) may have a melt flow rate (ISO 1133, 2.16 kg, 230° C.) of 4 to 20 g/10 min, preferably of 5 to 15 g/10 min, more preferably of 6 to 12 g/10 min.

Glass Fibers/Coupling Agent/Additives

As mentioned above, the polyolefin composition according to the solution comprises glass fibers, in particular short glass fibers. The glass fibers used in the fiber reinforced composite preferably have an average fiber length in the range of from 2.0 to 10.0 mm, preferably in the range of 2.0 to 8.0 mm, even more preferably in the range of 2.0 to 6.0 mm, still more preferably in the range of 3.0 to 5.5 mm, even more preferably of 3.5-5.0 mm.

It is further preferred that the short glass fibers used in the fiber reinforced composite preferably have an average diameter of from 5 to 20 μm, more preferably from 8 to 18 μm, still more preferably 8 to 15 μm, even more preferably 10-15 μm, preferably of 11-14 μm, preferably 12-14 μm, more preferably of 12.3-13.7 μm, even more preferably of 12.5-13.5 μm.

In one preferred embodiment glass fibers are used which have a fiber length of 3.0-5.0 mm (average 4.0 mm), and a fiber diameter of 12.3-13.7 μm (average 13 μm). In another preferred embodiment glass fibers are used which have a fiber length of 3.5-5.5 mm (average 4.5 mm), and a fiber diameter of 12-14 μm (average 13 μm).

As also mentioned above, the polyolefin composition according to the solution comprises at least one coupling agent. The at least one coupling agent is a functionalized polypropylene, in particular a polypropylene functionalized with maleic anhydride (MAH). The amount of coupling agent in the polyolefin composition may be 1-2 wt %, such as 1 wt % or 1.25 wt %.

In a further embodiment the polyolefin composition may comprise further additives. Examples of additives for use in the composition are pigments or dyes (for example carbon black), stabilizers (anti-oxidant agents), anti-acids and/or anti-UVs, antistatic agents, nucleating agents and utilization agents (such as processing aid agents). Preferred additives are carbon black, at least one antioxidant and/or at least one UV stabilizer.

Generally, the amount of these additives is in the range of 0 to 5.0 wt %, preferably in the range of 0.01 to 3.0 wt %, more preferably from 0.01 to 2.0 wt % based on the weight of the total composition.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends. Preferred antioxidants may be Tris (2,4-di-t-butylphenyl) phosphite and/or Octadecyl 3-(3',5'-di-tert. butyl-4-hydroxyphenyl)propionate.

Anti-acids are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

Anti-UVs are, for example, Bis-(2,2,6,6-tetramethyl-4-piperidyl)-sebacate (CAS-No. 52829-07-9, Tinuvin 770);

2-hydroxy-4-n-octoxy-benzophenone (CAS-No. 1843-05-6, Chimassorb 81). Preferred UV stabilizers may be low and/or high molecular weight UV stabilizers such as n-Hexadecyl-3,5-di-t-butyl-4-hydroxybenzoate, A mixture of esters of 2,2,6,6-tetramethyl-4-piperidinol and higher fatty acids (mainly stearic acid) and/or Poly((6-morpholino-s-triazine-2,4-diyl)(1,2,2,6,6-pentamethyl-4-piperidyl)imino)hexam-eth-ylene (1,2,2,6,6-pentamethyl-4-piperidyl)imino)).

Alpha nucleating agents like sodium benzoate (CAS No. 532-32-1); 1,3:2,4-bis(3,4-dimethylbenzylidene)sorbitol (CAS 135861-56-2, Millad 3988). Suitable antistatic agents are, for example, glycerol esters (CAS No. 97593-29-8) or ethoxylated amines (CAS No. 71786-60-2 or 61791-31-9) or ethoxylated amides (CAS No. 204-393-1). Usually these additives are added in quantities of 100-2.000 ppm for each individual component of the polymer.

It is appreciated that the solution also refers to a process for producing the polyolefin compositions as defined herein. The process comprises the steps of

- providing a mixture of the at least first polypropylene homopolymer; optionally the at least one second polypropylene homopolymer, further optionally the at least one third polyproyplene homopolymer, even further optionally the at least one polypropylene heterophasic copolymer; the blend (A) of recycled material, glass fibers and the at least one coupling agent in the required amounts;
- melting the mixture in an extruder, and
- optionally pelletizing the obtained polyolefin composition.

For the purposes of the solution, any suitable melting and mixing means known in the art may be used for carrying out the mixing and melting.

However, the melting and mixing step preferably takes place in a mixer and/or blender, high or low shear mixer, high-speed blender, or a twin-screw extruder. Most preferably, the melting and mixing step takes place in a twin-screw extruder such as a co-rotating twin-screw extruder. Such twin-screw extruders are well known in the art and the skilled person will adapt the melting and mixing conditions (such as melting temperature, screw speed and the like) according to the process equipment.

The polyolefin composition according to the solution can be used for a wide range of applications, for example in the manufacture of structural products, appliances, automotive articles, pipes, films, geo-membranes, roofing applications, pond liners, packaging, caps and closures. Additionally, due to the satisfactory tensile properties of the compositions of the solution, they may be employed as films (with a thickness of 400 microns or less) or for flexible foils (with a thickness of more than 400 microns) such as geo-membranes for agriculture, roofing applications and as pond liners. Typically, the compositions described herein are used as a core layer of a multilayer sheet (e.g. a three layer geo-membrane sheet), where the external layers are made of various kinds of polyolefin materials.

EXPERIMENTAL SECTION

The following Examples are included to demonstrate certain aspects and embodiments of the solution as described in the claims. It should be appreciated by those of skill in the art, however, that the following description is illustrative only and should not be taken in any way as a restriction of the solution.

Test Methods

The following definitions of terms and determination methods apply for the above general description of the solution as well as to the below examples unless otherwise defined.

a) Determination of the Content of Isotactic Polypropylene (iPP), Polystyrene (PS), Ethylene, PVC and Polyamide-6 in the Recyclate Blend Sample Preparation All calibration samples and samples to be analyzed were prepared in similar way, on molten pressed plates. Around 2 to 3 g of the compounds to be analyzed were molten at 190° C. Subsequently, for 20 seconds 60 to 80 bar pressure was applied in a hydraulic heating press. Next, the samples are cooled down to room temperature in 40 seconds in a cold press under the same pressure, in order to control the morphology of the compound. The thickness of the plates was controlled by metallic calibrated frame plates 2.5 cm by 2.5 cm, 100 to 200 μm thick (depending MFR from the sample); two plates were produced in parallel at the same moment and in the same conditions. The thickness of each plate was measured before any FTIR measurements; all plates were between 100 to 200 μm thick. To control the plate surface and to avoid any interference during the measurement, all plates were pressed between two double-sided silicone release papers. In case of powder samples or heterogeneous compounds, the pressing process was repeated three times to increase homogeneity by pressed and cutting the sample in the same conditions as described before.

Spectrometer

Standard transmission FTIR spectroscope such as Bruker Vertex 70 FTIR spectrometer was used with the following set-up:

- a spectral range of 4000-400 $cm^{-1}$,
- an aperture of 6 mm,
- a spectral resolution of 2 $cm^{-1}$,
- with 16 background scans, 16 spectrum scans,
- an interferogram zero filling factor of 32,
- Norton Beer strong apodisation.

Spectrum were recorded and analysed in Bruker Opus software.

Calibration Samples

As FTIR is a secondary method, several calibration standards were compounded to cover the targeted analysis range, typically from:

- 0.2 wt.-% to 2.5 wt.-% for PA
- 0.1 wt.-% to 5 wt.-% for PS
- 0.2 wt.-% to 2.5 wt.-% for PET
- 0.1 wt.-% to 4 wt.-% for PVC The following commercial materials were used for the compounds: Borealis HC600TF as iPP, Borealis FB3450 as HDPE and for the targeted polymers such RAMAPET N1S (Indorama Polymer) for PET, Ultramid® B36LN (BASF) for Polyamide 6, Styrolution PS 486N (Ineos) for High Impact Polystyrene (HIPS), and for PVC Inovyn PVC 263B (under powder form).

All compounds were made at small scale in a Haake kneader at a temperature below 265° C. and less than 10 minutes to avoid degradation. Additional antioxidant such as Irgafos 168 (3000 ppm) was added to minimise the degradation.

Calibration

The FTIR calibration principal was the same for all the components: the intensity of a specific FTIR band divided by the plate thickness was correlated to the amount of component determined by $^{1}H$ or $^{13}C$ solution state NMR on the same plate.

Each specific FTIR absorption band was chosen due to its intensity increase with the amount of the component concentration and due to its isolation from the rest of the peaks, whatever the composition of the calibration standard and real samples.

This methodology was described in the publication from Signoret et al. "*Alterations of plastic spectra in MIR and the potential impacts on identification towards recycling*", Resources, conservation and Recycling journal, 2020, volume 161, article 104980.

The wavelength for each calibration band was:

3300 $cm^{-1}$ for PA,
1601 $cm^{-1}$ for PS,
1410 $cm^{-1}$ for PET,
615 $cm^{-1}$ for PVC,
1167 $cm^{-1}$ for iPP.

For each polymer component i, a linear calibration (based on linearity of Beer-Lambert law) was constructed. A typical linear correlation used for such calibrations is given below:

$$xi = A_i \cdot \frac{E_i}{d} + B_i$$

where $x_i$ is the fraction amount of the polymer component i (in wt %)

$E_i$ is the absorbance intensity of the specific band related to the polymer component i (in a.u. absorbance unit). These specific bands are, 3300 $cm^{-1}$ for PA, 1601 $cm^{-1}$ for PS, 1410 $cm^{-1}$ for PET, 615 $cm^{-1}$ for PVC, 1167 $cm^{-1}$ for iPP d is the thickness of the sample plate $A_i$ and $B_i$ are two coefficients of correlation determined for each calibration curve No specific isolated band can be found for C2 rich fraction and as a consequence the C2 rich fraction is estimated indirectly, $$x_{C2\ rich}=100-(x_{iPP}+x_{PA}+x_{PS}+x_{PET}+x_{EVA}+x_{PVC}+x_{chalk}+x_{talc})$$

The EVA, Chalk and Talc contents are estimated "semi-quantitatively". Hence, this renders the C2 rich content "semi-quantitative".

For each calibration standard, wherever available, the amount of each component is determined by either $^{1}H$ or $^{13}C$ solution state NMR, as primary method (except for PA). The NMR measurements were performed on the exact same FTIR plates used for the construction of the FTIR calibration curves.

Calibration standards were prepared by blending iPP and HDPE to create a calibration curve. The thickness of the films of the calibration standards were 300 μm. For the quantification of the iPP, PS and PA 6 content in the samples quantitative IR spectra were recorded in the solid-state using a Bruker Vertex 70 FTIR spectrometer. Spectra were recorded on 25×25 mm square films of 50 to 100 μm thickness prepared by compression moulding at 190° C. and 4 to 6 mPa. Standard transmission FTIR spectroscopy was employed using a spectral range of 4000 to 400 $cm^{-1}$, an aperture of 6 mm, a spectral resolution of 2 $cm^{-1}$, 16 background scans, 16 spectrum scans, an interferogram zero filling factor of 32 and Norton Beer strong apodisation.

The absorption of the band at 1167 $cm^{-1}$ in iPP was measured and the iPP content was quantified according to a calibration curve (absorption/thickness in cm versus iPP content in wt.-%).

The absorption of the band at 1601 $cm^{-1}$ (PS) and 3300 $cm^{-1}$ (PA6) were measured and the PS- and PA6 content quantified according to the calibration curve (absorption/thickness in cm versus PS and PA content in wt.-%). The content of ethylene was obtained by subtracting the content of iPP, PS and PA6 from 100. The analysis was performed as double determination.

b) Amount of Talc and Chalk were measured by Thermogravimetric Analysis (TGA); experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. ($WCO_2$) was assigned to $CO_2$ evolving from $CaCO_3$, and therefore the chalk content was evaluated as:

$$\text{Chalk content}=100/44\times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content}=(\text{Ash residue})-56/44\times WCO_2-Wcb$$

Where Ash residue is the weight % measured at 900° C. in the first step conducted under nitrogen. The ash content is estimated to be the same as the talc content for the investigated recyclates.

c) Amount of Paper, Wood

Paper and wood were determined by conventional laboratory methods including milling, floatation, microscopy and Thermogravimetric Analysis (TGA) or floating techniques.

d) Amount of Metals was determined by x ray fluorescence (XRF).

e) Amount of Limonene was determined by solid phase microextraction (HS-SPME-GC-MS). Additional details are given below with respect to the specific sample.

f) Amount of total fatty acids was determined by solid phase microextraction (HS-SPME-GC-MS).

Additional details are given below with respect to the specific sample.

g) Melt flow rates were measured with a load of 2.16 kg ($MFR_2$) at 230° C. or 190° C. as indicated. The melt flow rate is that quantity of polymer in grams which the test apparatus standardized to ISO 1133 extrudes within 10 minutes at a temperature of 230° C. (or 190° C.) under a load of 2.16 kg.

h) Tensile Modulus, Tensile Strength, Tensile Strain at Break, Tensile Strain at Tensile Strength, Tensile Stress at Break The measurements were conducted after 96 h conditioning time (at 23° C. at 50% relative humidity) of the test specimen.

Tensile Modulus was measured according to ISO 527-2 (cross head speed=1 mm/min; 23° C.) using injection moulded specimens as described in EN ISO 1873-2 (dog bone shape, 4 mm thickness).

Tensile strength and tensile Strain at Break was measured according to ISO 527-2 (cross head speed=50 mm/min; 23°

C.) using injection moulded specimens as described in EN ISO 1873-2 (dog bone shape, 4 mm thickness).

Tensile Strain at Tensile Strength was determined according to ISO 527-2 with an elongation rate of 50 mm/min until the specimen broke using injection moulded specimens as described in EN ISO 1873-2 (dog bone shape, 4 mm thickness).

Tensile Stress at Break was determined according to ISO 527-2 (cross head speed=50 mm/min) on samples prepared from compression-moulded plaques having a sample thickness of 4 mm.

i) Impact strength was determined as Charpy Impact Strength according to ISO 179-1/1eA at +23° C. (Notched) or according to ISO 179-1/1eU +23° C. (Unnotched) on injection moulded specimens of 80×10×4 mm prepared according to EN ISO 1873-2. According to this standard samples are tested after 96 hours.

In the following Tables 1-4 several examples a (comparative-CE; inventive-IE) are summarized. For the 20 and the 30 wt % GF grades it can be summarized that the stiffness drops only after an addition of 25 wt % REC material and is still at an acceptable level thereafter compared to the virgin reference.

Table 1 refers to a polyolefin composition comprising one propylene homopolymer (PPH-1. $MFR_2$ of 8 g/10 min, $T_c$=112.3° C.), blend (A) of recycled material, Glass Fibers (GF1.2), coupling agent and further additives.

Table 2 refers to properties of a polyolefin composition comprising a first polypropylene homopolymer (PPH-1, $MFR_2$ of 8 g/10 min, $T_c$=112.3° C.), a second polypropylene homopolymer (PPH-6, $MFR_2$ of 0.2 g/10 min, $T_c$=118.9° C.), blend (A) of recycled material, Glass Fibers (GF 1.2), coupling agent and further additives.

Table 3 refers to properties of a polyolefin composition comprising a first polypropylene homopolymer (PPH-2, $MFR_2$ of 20 g/10 min, $T_c$=129.6° C.), a second polypropylene homopolymer (PPH-3, $MFR_2$ of 75 g/10 min, $T_c$=116.9° C.), a third polypropylene homopolymer (PPH-6, $MFR_2$ of 0.2 g/10 min, $T_c$=118.9° C.), blend (A) of recycled material, Glass Fibers (GF 1.2), coupling agent and further additives.

Table 4 refers to properties of a polyolefin composition comprising different polypropylene homopolymers (PPH-1 with $MFR_2$ of 8 g/10 min, PPH-2 with $MFR_2$ of 20 g/10 min, PPH-3 with $MFR_2$ of 75 g/10 min, PPH-4 with $MFR_2$ of 125 g/10 min PPH-5 with $MFR_2$ of 800 g/10 min, PPH-6 with $MFR_2$ of 0.2 g/10 min), a heterophasic polypropylene copoylmer (PPHeco-1 with $MFR_2$ of 18 g/10 min), blend (A) of recycled material, Glass Fibers (GF 1.2), coupling agent and further additives.

Glass fibers may be obtained from one of the following suppliers: OC (Owens Corning), PPG/NEG, Johns Manville, 3B, Jushi, Taiwan Glass, Camelyaf, CPIC, Taishan, Glass fibers 1.2. (average length 4 mm, average diameter 13 μm) and 4.1 (average length 4.5 mm, average diameter 13 μm) may be used.

The following additives were used: Antioxidants: AO1 (Irganox1010FF), AO2, (ARENOX DS), AO3 (IRGAFOS 168FF), AO4; Pigment: CB (Plasblak PE6121, commercerially available from Cabot); Coupling agent: SCONA TPPP 8112 GA (AP 1.5 Adhesion promoter: Polypropylene highly functionalized with maleic anhydride).

TABLE 1

Properties of polyolefin composition comprising one propylene homopolymer (PPH-1 with $MFR_2$ of 8 g/10 min), or a blend (A) of recycled material (Dipolen) each mixed with Glass Fibers GF 1.2 (Comparitive Examples CE1-2) and polyolefin compositions comprising one propylene homopolymer (PPH-1 with $MFR_2$ of 8 g/10 min), a blend (A) of recycled material (Dipolen) and with Glass Fibers GF 1.2 according to the solution (Inventive Examples IE1-2)

| | unit | CE1 | IE1 | CE2 |
|---|---|---|---|---|
| Component | | | | |
| PPH-1 | wt % | 67.55 | 33.4 | 0 |
| DIPOLEN PP-70 | wt % | 0 | 32.9 | 66.3 |
| GLASS 1.2 | wt % | 30.00 | 30 | 30 |
| AP 1.5 | wt % | 1.00 | 1 | 1 |
| CB | wt % | 0.70 | 0.70 | 0.70 |
| AO1 | wt % | 0.25 | 0.25 | 0.25 |
| AO2 | wt % | 0.40 | 0.40 | 0.40 |
| AO3 | wt % | 0.10 | 0.10 | 0.10 |
| | | 100.00 | 100 | 100.00 |
| Key properties | | | | |
| $MFR_2$ 230° C./2, 16 kg | g/10 min | 2.9 | 4.0 | 4.6 |
| Ash content | wt % | 30.4 | | 30.8 |
| Tensile modulus 23° C. | MPa | 7155 | 6620 | 6030 |
| Tensile stress at yield 23° C. | MPa | 105.6 | 83.2 | 71.9 |
| Tensile strain at yield 23° C. | % | 3.06 | 2.48 | 2.76 |
| Tensile stress at break (@50 mm/min) 23° C. | MPa | 105 | 82 | 70.8 |
| Tensile strain at break (@50 mm/min) 23° C. | % | 3.23 | 2.75 | 3.16 |
| Charpy 1eA +23° C. | kJ/$m^2$ | 11.55 | 8.22 | 8.54 |
| Charpy 1eU +23° C. | kJ/$m^2$ | 54.31 | 37.4 | 36.90 |

As can be seen in Table 1 the melt flow rate of the homopolymer-recyclate composition according to the inventive example IE is higher than the one of the virgin homopolymer (CE-1) but lower than the one of the recyclate (CE-2). On the other hand, the tensile modulus of the homopolymer-recyclate composition according to the inventive example is lower than the one of the virgin homopolymer (CE-1) but higher than the one of the recyclate (CE-2).

Thus, the properties of the homopolymer-recyclate composition according to the solution are characterized by a melt flow rate allowing a good processing and by a tensile modulus indicating a stable material.

Furthermore, the properties of the homopolymer-recyclate composition according to the solution are in a range between the ones of a virgin homopolymer and a recyclate. Thus, the homopolymer-recyclate composition according to the solution has similar properties to virgin homopolymer, but comprising a percentage of recyclate and having therefore a better $CO_2$ foot print.

TABLE 2

Properties of a polyolefin composition comprising a first polypropylene homopolymer (PPH-1 with MFR2 of 8 g/10 min ), a second polypropylene homopolymer (PPH-6 with MFR2 of 0.2 g/10 min) or a blend (A) of recycled material without or with Glass Fibers GF 1.2 (Comparitive Examples CE3-6) and polyolefin compositions comprising a first polypropylene homopolymer (PPH-1 with MFR2 of 8 g/10 min) or a second polypropylene homopolymer (PPH-6 with MFR2 of 0.2 g/10 min ), a blend (A) of recycled material and Glass Fibers GF 1.2 according to the solution (Inventive Examples IE2-7)

| Component | unit | CE3 | CE4 | CE5 | CE6 | IE2 | IE3 | IE4 | IE5 | IE6 | IE7 |
|---|---|---|---|---|---|---|---|---|---|---|---|
| PPH-1 | wt % | 67.55 | | 81.9 | | 50.6 | 42.5 | 33.7 | 46.5 | 38.9 | 31.1 |
| PPH-6 | wt % | | | 16.0 | 16.0 | | | | 16.0 | 16.0 | 16.0 |
| Dipolen PP-70 | wt % | | 67.5 | | 61.9 | 16.9 | 25.0 | 33.8 | 15.4 | 26.0 | 30.8 |
| GLASS 1.2 | wt % | 30 | 30 | 20 | 20 | 30 | 30 | 30 | 20 | 20 | 20 |
| AP1.5 | wt % | 1.00 | 1.0 | 1.0 | 1.0 | 1.0 | 1.0 | 1.0 | 1.0 | 1.0 | 1.0 |
| CB | wt % | 0.70 | 0.7 | 0.7 | 0.7 | 0.7 | 0.7 | 0.7 | 0.7 | 0.7 | 0.7 |
| AO1 | wt % | 0.25 | 0.3 | 0.3 | 0.3 | 0.3 | 0.3 | 0.3 | 0.3 | 0.3 | 0.3 |
| AO2 | wt % | 0.40 | 0.40 | | | 0.40 | 0.40 | 0.40 | | | |
| AO3 | wt % | 0.10 | 0.1 | 0.1 | 0.1 | 0.1 | 0.1 | 0.1 | 0.1 | 0.1 | 0.1 |
| $MFR_2$ 230° C./2.16 kg | g/10 min | 2.9 | 6.8 | 1.61 | 3.02 | 3.9 | 4.2 | 4.6 | 2.1 | 2.2 | 2.3 |
| Ash content | wt % | 30.4 | 31.1 | 20.33 | 21.08 | 30.5 | 30.6 | 30.9 | 20.55 | 20.96 | 20.76 |
| Tensile modulus 23° C. | MPa | 7155 | 6151 | 5029 | 4348 | 6958 | 8848 | 6731 | 4877 | 4790 | 4711 |
| Tensile stress at break (@50 mm/min) 23° C. | MPa | 105 | 73.4 | 81.98 | 59.46 | 90.1 | 86.4 | 84.3 | 71 | 68.1 | 66.81 |
| Charpy 1eA +23° C. | $kJ/m^2$ | 11.6 | 9.0 | 10.3 | 8.1 | 8.8 | 8.3 | 8.5 | 7.8 | 7.9 | 7.6 |
| Charpy 1eU +23° C. | $kJ/m^2$ | 54.3 | 38.2 | 48.8 | 37.5 | 43.1 | 42.2 | 40.4 | 38.7 | 36.9 | 37.0 |

Table 2 shows (similar to the results in Table 1) that the melt flow rate of the homopolymer-recyclate composition according to the inventive examples IE2-7 is higher than the one of the virgin homopolymer (CE-3) but lower than the one of the recyclate (CE-4). On the other hand, the tensile modulus of the homopolymer-recyclate composition according to the inventive examples IE2-4 is lower than the one of the virgin homopolymer (CE-3) but higher than the one of the recyclate (CE-4). The results also illustrate the impact of the amount of glass fibers, the more glass fibers added the higher is the tensile modules (see IE2-4 and IE5-7).

TABLE 3

Properties of a polyolefin composition comprising a polypropylenes homopolymers (PPH-1 with $MFR_2$ of 8 g/10 min, PPH-2 with $MFR_2$ of 20 g/10 min, PPH-3 with $MFR_2$ of 75 g/10 min, PPH-6 with $MFR_2$ of 0.2 g/10 min ), or a blend (A) of recycled material (Dipolen) without or with Glass Fibers GF 1.2 (Comparitive Examples CE7-10) and polyolefin compositions comprising a first polypropylene homopolymer (PPH-1 with $MFR_2$ of 8 g/10 min), a second polypropylene homopolymer (PPH-2 with $MFR_2$ of 20 g/10 min ), a third polypropylene homopolymer (PPH-3 with $MFR_2$ of 75 g/10 min ) or a fourth polypropylene homopolymer (PPH-6 with $MFR_2$ of 0.2 g/10 min), a blend (A) of recycled material (Dipolen) and Glass Fibers GF 1.2 according to the solution (Inventive Examples IE8-11).

| Components | unit | CE7 | CE8 | CE9 | CE10 | IE8 | IE9 | IE10 | IE11 | IE16 |
|---|---|---|---|---|---|---|---|---|---|---|
| PPH-1 | wt % | 67.55 | | 61.65 | 61.55 | | | | | |
| PPH-2 | wt % | | | | | 11.75 | 11.75 | 13.35 | 13.35 | 56.2 |
| PPH-3 | wt % | | | | | 22.9 | 25.9 | 27.9 | 33.6 | |
| PPH-6 | wt % | | | 16 | 16 | 4.9 | 4.9 | 5.6 | 5.5 | |
| Dipolen PP-70 | wt % | | 67.55 | | | 28.0 | 25.0 | 30.7 | 25.0 | 20.00 |
| GLASS 1.2 | wt % | 30 | 30 | 20 | 20 | 30 | 30 | 20 | 20 | 20.00 |
| AP1.5 | wt % | 1.0 | 1.0 | 1.0 | 1.0 | 1.0 | 1.0 | 1.0 | 1.0 | 1.00 |
| CB | wt % | 0.7 | 0.7 | 0.7 | 0.7 | 0.7 | 0.7 | 0.7 | 0.7 | 0.7 |
| AO1 | wt % | 0.25 | 0.25 | | 0.25 | 0.25 | 0.25 | 0.25 | 0.25 | 0.25 |
| AO2 | wt % | 0.4 | 0.4 | | 0.1 | 0.4 | 0.4 | 0.1 | 0.1 | 0.4 |
| AO3 | wt % | 0.1 | 0.1 | 0.4 | 0.4 | 0.1 | 0.1 | 0.4 | 0.4 | 0.1 |
| AO4 | wt % | | | 0.25 | | | | | | |
| $MFR_2$ 230° C./2.16 kg | g/10 min | 2.9 | 6.8 | 1.7 | 1.6 | 6.9 | 7.6 | 9.0 | 10.0 | 8.39 |
| Ash content | wt % | 30.4 | 31.1 | 19.7 | 20.3 | 31.0 | 30.3 | 20.8 | 20.2 | 21.7 |
| Tensile modulus 23° C. | MPa | 7155 | 6151 | 5054 | 5029 | 6958 | 7048 | 4947 | 5043 | 5256 |
| Tensile strain at break (@50 mm/min) 23° C. | % | 3.23 | 2.95 | 3.63 | 3.63 | 2.50 | 2.48 | 2.85 | 2.77 | |
| Charpy 1eA +23° C. | $kJ/m^2$ | 11.6 | 9.0 | 9.3 | 10.3 | 7.7 | 7.8 | 6.1 | 6.3 | 6.0 |
| Charpy 1eU +23° C. | $kJ/m^2$ | 54.3 | 38.2 | 48.1 | 48.6 | 37.9 | 38.0 | 33.0 | 33.5 | |

Table 3 shows (similar to the previous results) that the melt flow rate of the homopolymer-recyclate composition according to the inventive examples IE 8-11 is higher than the one of the virgin homopolymer (CE-1). The tensile modulus of the homopolymer-recyclate composition according to the inventive examples again illustrate the impact of the amount of glass fibers, the more glass fibers added the higher is the tensile modules (see IE8-11).

TABLE 4

Properties of a polyolefin composition comprising two polypropylenes polymers (PPH-1 with $MFR_2$ of 8 g/10 min, PPH-3 with 75 g/10 min, PPH-6 with $MFR_2$ of 0.2 g/10 min, PPHeco-1 with $MFR_2$ of 18 g/10 min) with Glass Fibers GF 1.2 but without a blend (A) of recycled material. (Dipolen) (Comparitive Examples CE11-12) and a polyolefin composition comprising different polypropylene homopolymers (PPH-1 with $MFR_2$ of 8 g/10 min, PPH-2 with $MFR_2$ of 20 g/10 min, PPH-3 with $MFR_2$ of 75 g/10 min, PPH-4 with $MFR_2$ of 125 g/10 min PPH-5 with $MFR_2$ of 800 g/10 min, PPH-6 with $MFR_2$ of 0.2 g/10 min ), and/or a heterophasic polypropylene copoylmer (PPHeco-1 with $MFR_2$ of 18 g/10 min ), blend (A) of recycled material (Dipolen) and Glass Fibers GF 1.2 according to the solution (Inventive Examples IE12-15)

| Components | unit | IE12 | IE13 | IE14 | IE15 | CE11 | CE22 |
|---|---|---|---|---|---|---|---|
| PPH-1 | wt % | | | | | 62.55 | |
| PPH-2 | wt % | 12.55 | 27.55 | | 15.55 | | |
| PPH-3 | wt % | | | | | | 49.55 |
| PPH-4 | wt % | 15 | | 22.55 | 22 | | |
| PPH-5 | wt % | | 10 | | | | |
| PPHeco-1 | wt % | 10 | | 15 | | | 28 |
| PPH-6 | wt % | | | | | 15 | |
| Dipolen PP-70 | wt % | 40.00 | 40.00 | 40.00 | 40.00 | | |
| GLASS 1.2 | wt % | 20.00 | 20.00 | 20.00 | 20.00 | 20.00 | 20.00 |
| AP1.5 | wt % | 1.00 | 1.00 | 1.00 | 1.00 | 1.00 | 1.00 |
| CB | wt % | 0.70 | 0.70 | 0.70 | 0.70 | 0.70 | 0.70 |
| AO1 | wt % | 0.25 | 0.25 | 0.25 | 0.25 | 0.25 | 0.25 |
| AO2 | wt % | 0.40 | 0.40 | 0.40 | 0.40 | 0.40 | 0.40 |
| AO3 | wt % | 0.10 | 0.10 | 0.10 | 0.10 | 0.10 | 0.10 |
| AO4 | wt % | | | | | | |
| SUM | | 100.0 | 100.0 | 100.0 | 100.0 | 100.0 | 100.0 |
| **Key properties** | **unit** | | | | | | |
| Tm | ° C. | 163.90 | 164.30 | 163.20 | 164.20 | 165.80 | 163.20 |
| Density | g/cm$^3$ | 1053.2 | 1058.4 | 1053.0 | 1058.8 | 1053.3 | 1027.9 |
| MFR 230° C./2.16 kg | g/10 min | 11.4 | 17.4 | 13.3 | 13.0 | 1.8 | 16.4 |
| Ash content | wt % | 20.8 | 21.1 | 20.8 | 20.9 | 20.1 | 20.7 |
| Flexural modulus 23° C. | MPa | 3985 | 4227 | 3848 | 4173 | 4383 | 3922 |
| Tensile modulus 23° C. | MPa | 4599 | 4849 | 4454 | 4824 | 5092 | 4704 |
| Tensile stress at break (@50 mm/min) 23° C. | MPa | 61.78 | 67.66 | 59.18 | 67.21 | 81.48 | 75.54 |
| Charpy 1eA +23° C. | kJ/m$^2$ | 7.2 | 6.2 | 7.6 | 6.3 | 9.5 | 11.0 |

The results in Table 4 show that melt flow rate and tensile modulus of the homopolymer-recyclate composition according to the inventive examples IE 12-15 can be adjusted by the type of virgin polymer added to the composition.

The invention claimed is:

1. A polyolefin composition comprising a) 30-60 wt % (based on the overall weight of the polymer composition) of at least one polypropylene homopolymer, b) 15-40 wt % (based on the overall weight of the polymer composition) of a blend of recycled plastic material comprising polypropylene and polyethylene in a ratio between 3:7 and 10:1, which is recovered from a waste plastic material derived from post-consumer and/or post-industrial waste having a melt flow rate $MFR_2$ (230° C., 2.16 kg, measured according to ISO 1133) in the range of 8-14 g/10 min, c) 17-50 wt % (based on the overall weight of the polymer composition) of glass fibers; and d) 0.5-2.5 wt % (based on the overall weight of the polymer composition) of at least one coupling agent, and optionally further additives, wherein the sum of all ingredients add always up to 100 wt %, wherein the polyolefin composition has a melt flow rate $MFR_2$ (230° C., 2.16 kg, measured according to ISO 1133) of at least 2 g/10 min;

a tensile modulus at 23° C. of at least 4 GPa (ISO 527-2), and an impact strength (ISO179, charpy 1eA+23° C.) of at least 5 KJ/m$^2$.

2. The polyolefin composition according to claim 1, wherein it comprises a) 30-50 wt % (based on the overall weight of the polymer composition) of the at least one polypropylene homopolymer, b) 15-40 wt % (based on the overall weight of the polymer composition) of the blend of recycled plastic material comprising polypropylene and polyethylene having a melt flow rate $MFR_2$ (230° C., 2.16 kg, measured according to ISO 1133) in the range of 10-12 g/10 min, c) 20-50 wt % (based on the overall weight of the polymer composition) of glass fibers; and d) 0.5-2.5 wt % (based on the overall weight of the polymer composition) of the at least one coupling agent, and optionally further additives, wherein the sum of all ingredients add always up to 100 wt %.

3. The polyolefin composition according to claim 1, wherein it comprises a1) at least one first polypropylene homopolymer; and a2) at least one second polypropylene homopolymer;

wherein the at least one first polypropylene homopolymer, and the at least one second polypropylene homopolymer differ from each other in their melt flow rate $MFR_2$ (230° C., 2.16 kg load, measured according to ISO 1133).

4. The polyolefin composition according to claim 1, wherein it comprises a1) at least one first polypropylene homopolymer;

a2) at least one second polypropylene homopolymer; and a3) at least one third polypropylene homopolymer;

wherein the at least one first polypropylene homopolymer, the at least one second polypropylene homopolymer and the at least one third polypropylene homopolymer differ from each other in their melt flow rate $MFR_2$ (230° C., 2.16 kg load, measured according to ISO 1133).

5. The polyolefin composition according to claim 1, wherein the polypropylene homopolymers are selected from a group comprising at least one polypropylene homopolymer (PPH-1) having a melt flow rate $MFR_2$ (230° C., 2.16 kg, measured according to ISO 1133) in the range of 5 to 15 g/10 min;

at least one polypropylene homopolymer (PPH-2) having a melt flow rate $MFR_2$ (230° C., 2.16 kg, measured according to ISO 1133) in the range of range of 10 to 30 g/10 min;

at least one polypropylene homopolymer (PPH-3) having a melt flow rate $MFR_2$ (230° C., 2.16 kg, measured according to ISO 1133) in the range of 60 to 100 g/10 min;

at least one polypropylene homopolymer (PPH-4) having a melt flow rate $MFR_2$ (230° C., 2.16 kg, measured according to ISO 1133) in the range of 100 to 150 g/10 min;

at least one polypropylene homopolymer (PPH-5) having a melt flow rate $MFR_2$ (230° C., 2.16 kg, measured according to ISO 1133) in the range of 600 to 1000 g/10 min; and at least one polypropylene homopolymer (PPH-6) having a melt flow rate $MFR_2$ (230° C., 2.16 kg, measured according to ISO 1133) of ≤1.5 g/10 min.

6. The polyolefin composition according to claim 1, wherein it comprises at least one heterophasic polypropylene copolymer.

7. The polyolefin composition according to claim 6, wherein the heterophasic polypropylene copolymer is at least one heterophasic polypropylene copolymer (PPHeco-1) having a melt flow rate $MFR_2$ (230° C., 2.16 kg, measured according to ISO 1133) in the range of 15 to 25 g/10 min.

8. The polyolefin composition according to claim 1, having a melt flow rate $MFR_2$ (ISO 1133, 2.16 kg, 230° C., measured according to ISO 1133) in the range between 2 and 20 g/10 min.

9. The polyolefin composition according to claim 1, having a tensile modulus (ISO 527-2) of at least 4.0 GPa.

10. The polyolefin composition according to claim 1, having an impact strength (ISO179-1, Charpy 1eA+23° C.) of at least 5.0 $KJ/m^2$.

11. The polyolefin composition according to claim 1, wherein the glass fibers have a length of 2.0 to 10.0 mm and a diameter of from 5 to 20 μm.

12. The polyolefin composition according to claim 1, wherein the at least one coupling agent is a functionalized polypropylene.

13. An article comprising the polyolefin composition according to claim 1.

14. A process for preparing the polyolefin composition according to claim 1, comprising the steps of providing a mixture of the at least first polypropylene homopolymer; optionally the at least one second polypropylene homopolymer, further optionally the at least one third polypropylene homopolymer, even further optionally the at least one polypropylene heterophasic copolymer; the blend of recycled material, glass fibers and the at least one coupling agent in the required amounts;

melting the mixture in an extruder, and optionally pelletizing the obtained polyolefin composition.

* * * * *